Patented June 22, 1937

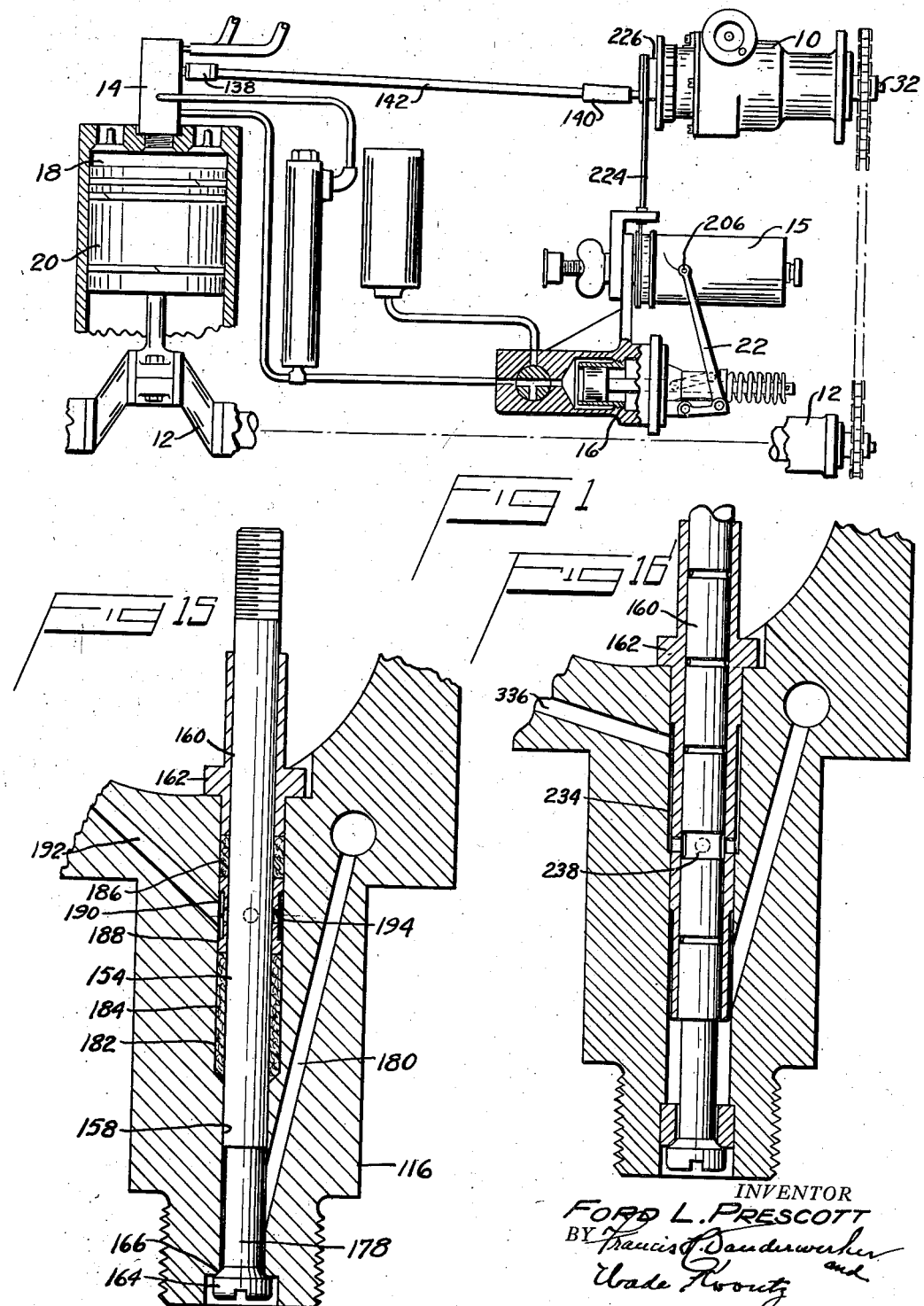

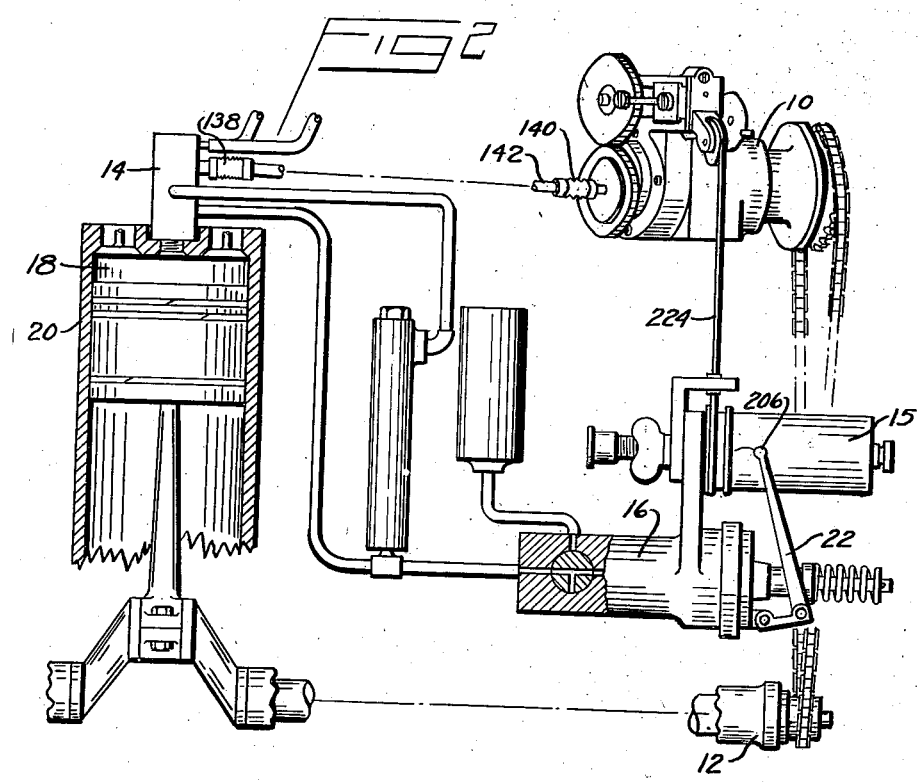
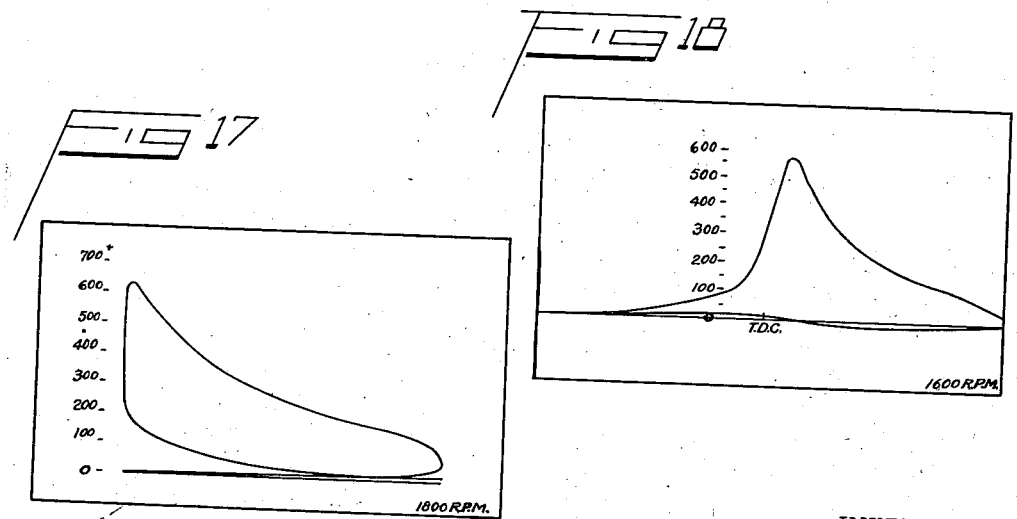

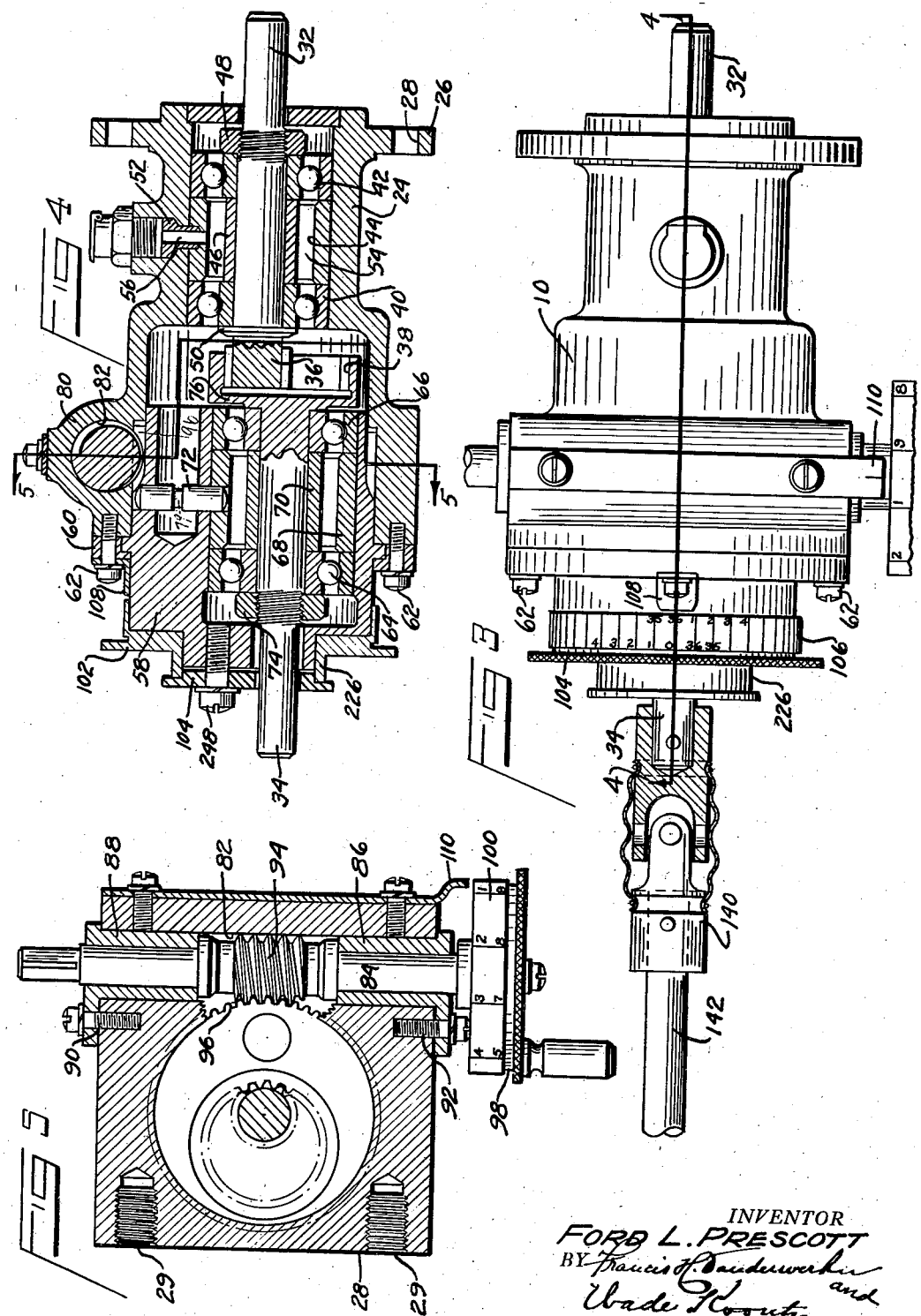

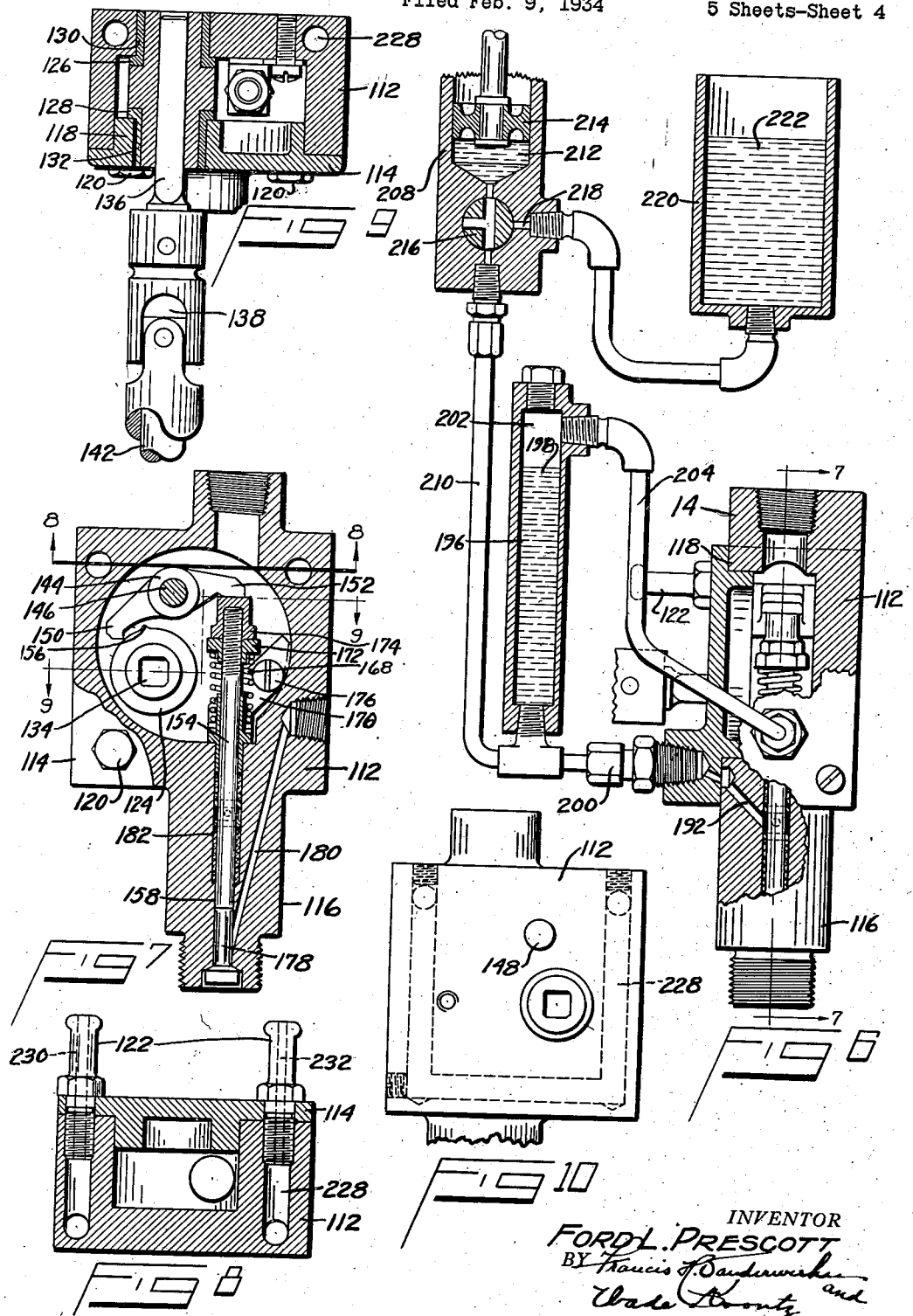

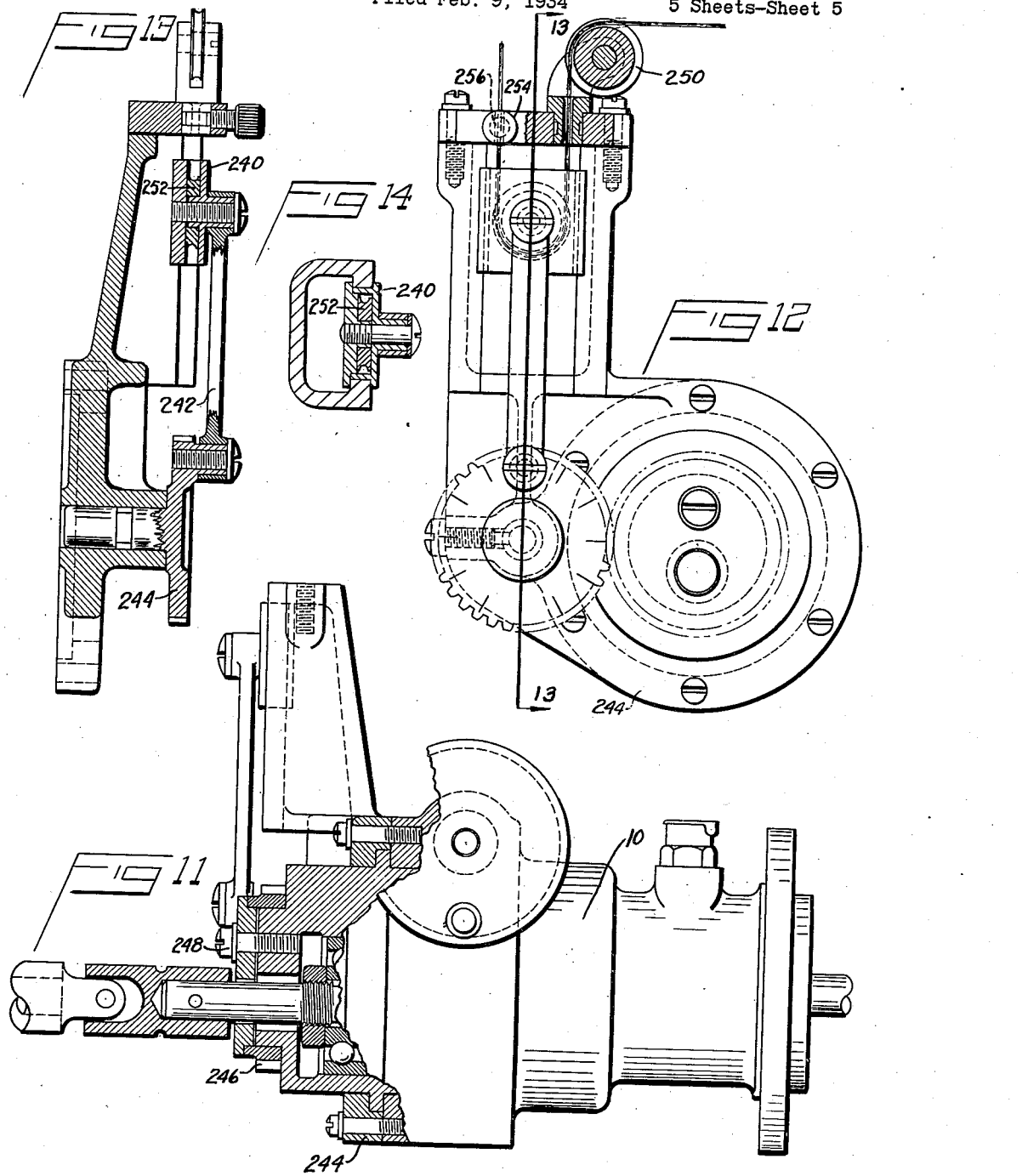

2,084,356

UNITED STATES PATENT OFFICE 2,084,356

ADJUSTING MEANS

Ford L. Prescott, Dayton, Ohio

Application February 9, 1934, Serial No. 710,500

12 Claims. (Cl. 74—395)

(Granted under the act of March 3, 1883, as amended April 30, 1928; 370 O. G. 757)

The invention described herein may be manufactured and used by or for the Government for governmental purposes, without the payment to me of any royalty thereon.

The present invention relates to improvements in pressure indicators and more particularly to indicators for recording the pressure diagrams of high speed engines, particularly of the internal combustion type.

The prior art teaches the use of indicating instrumentalities for testing and recording the pressure phenomena in high speed engines which embrace the sampling, or point by point method whereby the complete diagram of the average engine cycle is recorded.

In general, instruments of this character embody a sampler valve that is interposed between the combustion space and an ordinary low speed indicator and a phase gear that is employed to drive the sampler valve at engine cam shaft speed, the phase gear being so constructed that the phase or point in the cycle at which the valve opens for a brief instant is adjustable manually. The drum of the low speed indicator is also driven by the phase gear so that as the period of opening of the sampler valve is moved through the cycle, the drum will be simultaneously actuated in an amount proportionate to the corresponding crank angle or piston position. Continuous records are thus made of points taken from a large number of cycles of the engine. Suitable mechanism is provided between the phase gear and the recording drum so that the extent of displacement of the indicator drum will correspond either to the piston displacement or to the crank angle, as the function of either of which the pressure phenomena may be recorded.

The sampler valves that have heretofore been employed in devices of this character were remotely positioned from the point of combustion and they required a tube to connect the combustion space therewith; consequently introducing in the card record a time lag the extent of which depended upon the length of the tube connection and upon the rate at which the pressure is transmitted. Thus the entire card is caused to shift later by that time lag.

A further phase error was introduced in the card due to considerable back lash in the gear train of the phase changing mechanism heretofore employed.

The error introduced in the card by prior devices in which a valve was remotely positioned in the combustion chamber has been eliminated in accordance with my invention by positioning the sampler valve substantially at a wall of the combustion chamber.

The error that was introduced in the card by reason of the back lash present in the phase changing gear train of prior devices has been practically eliminated in accordance with my invention by reducing the number of gears to a minimum.

It has also been found by experiment that the sampler valves as well as the pressure recording element heretofore employed in devices of this character were not efficient at high pressures by reason of the fact that gases escaped between the working surfaces thereof with the result that the recorded pressures were found to be materially lower than the actual pressures within the combustion engine.

This invention therefore contemplates the provision of means for effectively sealing the working surfaces of the sampler valve to prevent the leakage of the gases through the clearances of the working surfaces under all operative conditions.

Certain other and further objects of my invention will appear from the following description of my invention taken in connection with the several views of the drawings.

Fig. 1 is a diagrammatic view of the system in which the several units are interconnected to produce a pressure time card and in which certain of the parts are shown in section.

Fig. 2 is a diagrammatic view showing a system for obtaining a pressure volume card in which certain parts are broken away and in section and showing the phase changing unit together with its respective connection in perspective.

Fig. 3 is a top plan view of the phase changing unit with means shown partly in section for universally connecting the same to the sampler valve, the phase changing unit being adapted for the taking of pressure time cards.

Fig. 4 is a longitudinal sectional view taken on the line 4—4 of Fig. 3.

Fig. 5 is a transverse sectional view taken on the line 5—5 of Fig. 4.

Fig. 6 is a partial schematic view in side elevation and section showing the particular arrangement of the sampler valve and its interconnections with the pressure recording element.

Fig. 7 is a transverse sectional view of the sampler valve taken on the line 7—7 of Fig. 6.

Fig. 8 is a transverse sectional view taken on the line 8—8 of Fig. 7.

Fig. 9 is a sectional view taken on the line

9—9 of Fig. 7 and showing also a fractional view of the driving connection.

Fig. 10 is a fractional side elevational view of the sampler unit.

Fig. 11 is a front elevational view of the phase changing unit with parts in section with provision adapted for taking pressure volume cards.

Fig. 12 is a side elevational view looking from left to right of Fig. 11.

Fig. 13 is a sectional view taken on the line 13—13 of Fig. 12.

Fig. 14 is a sectional detail view taken on the line 14—14 of Fig. 13.

Fig. 15 is an enlarged detail view of the poppet valve construction of the sampler valve shown in Fig. 7.

Fig. 16 is an enlarged detail view showing a modified form of the poppet valve.

Figs. 17 and 18 show pressure time and pressure volume cards respectively, taken with the systems of Figs. 1 and 2 respectively.

As illustrated herein and in accordance with my invention the systems shown in Figs. 1 and 2 for obtaining a pressure time card or a pressure volume card comprise essentially a phase changing unit 10 that is driven by the engine crankshaft 12 and operatively connected to the sampler valve unit 14 so that the sampler unit will admit gas therein under pressure during a brief interval once for each cycle of operation of the engine. This phase changing unit is also operatively connected to the recording drum 15 of the pressure recording unit 16 so that with every change of position of the period of admittance of the valve relative to the cycle of operation, the recording drum will be moved to a position corresponding to the said period of admittance in said cycle.

Referring to Figs. 3, 4, and 5, the phase changing unit as illustrated, may be supported in any suitable manner. For this purpose the casing 24 is provided with a flange 26 having suitable openings 28 to receive bolt and nut connections (not shown). The base 29 of the casing 24 may also be provided with threaded openings 30 for attaching screws (not shown) in case it is desired to support the phase changing unit upon a bracket (not shown).

The phase changing unit drive mechanism consists of a driving shaft 32 and a driven shaft 34 that are geared together by a pinion 36 fixed at the inner end of the driving shaft and by an internal gear 38 fixed at the inner end of the driven shaft. The driving shaft is journaled in the casing 24 by suitable bearings 40 and 42, that are held in spaced relation by means of sleeve spacers 44 and 46, together with nut 48, that is threaded on the driving shaft and shoulder 50. Spacer 44 is fixedly connected with the casing 24 by means of a hollowed dowel 52, whereas the inner spacer 46 and the two inner races of the bearings 40 and 42 are clamped between the nut 48 and shoulder 50 so as to rotate with the shaft, there being provided a space 54 between the two spacer members to receive lubricant that is fed therein through the opening 56 in the dowel.

The driven shaft has its axis of rotation disposed eccentric with respect to the axis of rotation of the driving shaft such that the internal gear 38 and the pinion 36 are in engagement at all times, the relation of the internal gearing and the pinion gearing being such that the driven shaft will rotate at half the speed of rotation of the driving shaft. The driven shaft is journaled within a phase changing gear 58, which in turn is journaled in the housing 24 and is retained in place by a flange ring 60 and screws 62. This phase gear is rotatably adjustable about an axis that is coincident with the axis of rotation of said driving shaft. The bearings 64 and 66 that journal the driven shaft are held in spaced relation by means of spacers 68 and 70, the spacer 68 being fixedly held to the phase changing gear by means of a dowel 72, whereas the spacer 70 and the inner races of the bearings are clamped between a nut 74 threaded onto the shaft and a shoulder 76 formed thereon. The dowel 72 is formed with an annular slot 79 to receive an instrument for disassembling the connected parts.

The housing 24 is formed with a boss 80 that is provided with a transverse opening 82 to receive a worm shaft 84 that is journaled therein by means of bearings 86 and 88, which in turn are fixedly connected to the housing by means of threaded members 90 and 92.

The worm shaft has a worm gear 94 fixedly mounted thereon and in gear with the toothed portion 96 of the phase gear 58. This worm shaft has attached at one end a crank wheel 98 the peripheral surface of which is provided with graduations 100.

The drive ratio between the worm 94 and the phase gear 58 is preferably 36 to 1 so that for every rotation of the worm gear the phase gear will move through a 10° angle. An adjustable scale member 102 is adjustably attached to the phase gear by means of a retaining plate 104. The graduations 106 on the scale member are spaced 10° apart and read against an index 108 that is fixedly attached to the clamping ring 60 to indicate each revolution of the worm. The scale 100, formed on the crank wheel, is divided into ten equal parts and reads against the index mark 110, which is fixed with respect to the housing so as to indicate each degree of rotation of the phase gear. It will be obvious that by adjusting the phase gear by means of the worm gear the driven shaft 34 will be displaced in phase with respect to the driving shaft 32.

The sampler unit 14, as best shown in Figs. 6 to 10, consists of a housing 112 that is provided with a cover plate 114 and with a threaded stem portion 116, which is adapted to be received within a suitable opening within the combustion chamber, as shown in Fig. 1. The cover plate is formed with an annular pilot 118, that is received within a complementary opening formed in the housing and is attached to the housing by means of bolts 120 and nipples 122 for a purpose hereinafter described.

The complementary opening in the housing is made sufficiently large to permit freedom of movement of the working parts disposed therein. A cam 124 is journaled within the housing by means of bearings 126 and 128, that are respectively seated within openings 130 and 132, formed within the housing and cover plate. The cam has concentric broached opening 134 to receive a driving shaft 136 that is universally connected with the phase gear through the universal connections 138 and 140 and the shaft 142, shown in Figs. 1 and 2. A rocker 144 is disposed within the opening of the housing and pivotally mounted on a rocker shaft 146 that is press-fitted into an opening 148 formed in the housing at one end and received in an opening formed in the cover plate at the other end. The rocker is disposed so that one arm 150 is adapted to cooperate with the cam 124, whereas the other arm 152 is seated on or cooperates with a sampler valve 154 of the balanced poppet valve. The cam 124 is provided with a sharp lobe 156 so as to engage with the arm of the rocker to open the poppet valve for a brief interval. The poppet valve is slidably fitted within a bore 158, preferably formed concentric with the stem of the housing and within an opening 160 formed in the gland 162. The poppet valve is formed with a head 164 which is positioned approximately at the wall of the combustion chamber 18 of the engine cylinder 20 and is seated against the valve seat 166 formed on the housing stem 116, as shown in Figs. 7 and 15, and is held in seated relation by means of a compression spring 168, that is disposed between a gland locking retainer 170 and a lock nut 172 that is threaded onto the valve stem. Interposed between the rocker arm 152 and the lock nut 172 is a tappet nut 174 that is threaded onto the poppet valve stem. The gland locking member 170 is formed with an opening at one end that slips over the gland and is attached to the housing by a screw 176 for fixing the gland in position.

The poppet valve at its lower end and adjacent the head 164 is formed with a reduced portion 178 to permit the gases to flow from the combustion chamber during the interval when the valve is open through the passageway 180 formed in the housing. The diameter of the valve stem and the diameter of the valve seat are made equal so that the pressure within the space between the reduced portion and the wall of the bore 158 will hold the balanced valve in equilibrium. The housing stem is formed with a counterbore 182 concentric with the bore 158 and is of a diameter equal to the diameter of the packing gland so as to provide a space between the poppet valve stem and the wall of the counterbore to receive packings 184 and 186, that are held in spaced relation by a packing spacer 188. The packing spacer is provided with an annular groove 190 for communicating with a passageway 192 formed in the housing and with perforations 194 for communicating oil to the poppet valve stem.

A liquid seal is maintained between the working surfaces of the poppet valve between the packings 186 and 188 at a pressure that is equal to the pressure of the gases that are trapped in the sampler valve. This is accomplished by providing a chamber 196 that is partially filled with sealing liquid 198, preferably oil, the chamber being so disposed with respect to the poppet valve that the sealing liquid within the chamber is above the passageway 192, to maintain at all times a supply of sealing liquid to the packing spacer. Communication between the bottom of the chamber and the passageway of the housing is established by means of pipe connections 200. The air space 202 above the sealing liquid in the chamber is in communication with the passageway 180 of the sampler valve by means of pipe connections 204. In this manner gases that are trapped within the sampler valve will exert their pressure influence against the sealing liquid, which by reason of its communication with the packing spacer will maintain within the spacer a pressure of sealing liquid at all times equal to the pressure of the entrapped gases at the bottom of the packing, thus preventing leakage of the gases.

Any suitable low speed pressure indicator may be employed as a recording means for obtaining pressure volume or pressure time card, and, as illustrated herein, the Maihak type of pressure recording indicator is employed for this purpose. The recording stylus 206, Figs. 1 and 2, of this recording pressure indicator is actuated by the pressure of the entrapped gases in the sampler valve and is preferably actuated through the liquid seal medium so that the escape of the gases through the working surfaces of the pressure recording device is prevented. This is accomplished by establishing communication between the bottom of the chamber 196 and the cylinder 208 of the pressure recording device through a pipe connection 210, the passageway in the pipe and the cylinder space 212 below the piston 214 being filled with the sealing liquid. This pressure recording device is provided with a conventional three-way cock 216, that is adapted to have communication with atmosphere through a passage 218 so that the atmospheric pressure may be recorded on the card. From the foregoing description it will be apparent that the intense pressures of the gaseous fluids in the internal combustion engine are not only transmitted to the recording device by means of a liquid medium, but that in addition thereto the said liquid medium serves to provide a liquid seal for the working surfaces of both the sampler valve and the pressure recording device.

In order to prevent air leakage within the liquid seal system, especially when the engine is running under pressure below atmosphere, a reservoir 220 of sealing liquid 222 may be connected to the atmospheric opening 218 of the indicator cock by means of a pipe connection 221. In this way should the pressure within the sampler valve be less than atmosphere the pressure differential between the atmosphere and that of the sampler valve will force some of the oil within the reservoir 220 into the system instead of allowing air to leak in.

The pressure recording device has the conventional recording drum 15, which is actuated by an indicator cord 224, one end of which is connected to the drum 15, the other end of which is connected to an extension 226, Figs. 1, 3, and 4, formed on the member 112 that carries the scale so that for any adjustment of the phase changing gear the recorder drum will assume a corresponding position. It will therefore be obvious that the recorded pressure is corelated to the time in the cycle of the period of opening the sampler valve, thus producing a pressure time record of the pressure cycle.

A suitable provision is made for dissipating the excess heat of the sampler valve. This is accomplished by circulating a cooling liquid through a suitable passageway 228 formed in the wall of the housing, the passageway 230 constituting an inlet and the passageway 232 constituting an outlet that are in communication with the passageway 228. The cooling liquid is supplied from a source of supply (not shown) and enters and leaves through the nipples 122, which nipples are preferably provided with threaded stems that pass through openings formed in the cover plate and serve to fasten the cover plate to the housing of the sampler valve.

The modification of sampler valve shown in Fig. 16 is similar in construction and design to the sampler valve shown in Fig. 15, except that the poppet valve is formed with a plurality of circumferential oil grooves disposed in spaced relation along the length of the poppet valve stem having a close fit with a valve guide. The valve guide has a pressed fit with the opening formed in the housing stem 116 and is provided with an annular recess 234 at the point which communicates with passageway 236 and is provided with a plurality of orifices for communication with an annulus 238. The sealing liquid is fed to the annulus in the same manner as it was before to the packing spacer in Fig. 15 to effect the liquid seal. By this arrangement the necessity for replacing the soft packing, as shown in Fig. 15, is eliminated.

In accordance with my invention, and as illustrated in Figs. 2 and 11 to 14 inclusive, the system is adapted for obtaining pressure volume cards. This is preferably accomplished by providing an adapter unit in which a cross head 240, connecting rod 242 and crank wheel 244 have substantially the same relationship as the piston connecting rod and crank of the engine, the adapter unit being detachably connected to a phase gear unit identical in construction to the phase gear unit described above, except that the scale carrying member and its index, together with the annular clamping ring for the phase gear are removed, the phase gear being held in position by the mounting flange 245 of the adapter unit. The phase gear is adapted to receive a gear 246, which is held adjustably in place by retaining plate 104 and the screw 248 and which is in mesh with the gear teeth formed on the crank wheel so that for any adjustment of the phase gear the crank wheel will be adjusted a corresponding amount.

The drum of the pressure recording device is connected to cross head 240 of the adapter unit by means of a cable, one end of which is fixed to the drum and which passes over pulley 250, around the cross head pulley 252 and is fixed by a suitable clamping means, such as a set screw 254 and opening 256, through which the cord passes. By actuating the phase changing mechanism through the worm gear and phase changing gear to obtain different successive periods of opening of the sampler valve, the cross head will be moved to successive positions corresponding to the positions of the engine piston during the period of opening of the sampler valve and the card thereof, which is actuated by movement of the cross head, will assume positions corresponding to the engine piston, thus producing a true pressure volume card.

In the operation of the device the engine is set at any identifying position, as, for example, at top dead center. The phase gear is then rotated by means of the worm 94 and crank wheel 98 so that the sampler valve will open at that predetermined position of the engine. When obtaining a pressure time card, the adjustable scale member 102 is moved so that the index 108 will indicate a corresponding position on the scale and similarly when taking a pressure volume card the cross head will be adjusted through the adjustable gear 246 to the position corresponding to the position of the piston. In either case a card is placed around the pressure recording drum and with the stylus pressed against the paper, the phase gear is slowly rotated by means of the crank wheel and handle 98 throughout one revolution of the phase gear. At the same time as the phase gear is being rotated the period of opening of the sampler valve is being moved through a corresponding engine crank angle.

Thus, as the sampler valve taps the cylinder pressure for a brief instant at gradually changing points in the cycle, the indicator stylus records automatically a series of pressure changes resulting in a distinct, continuous line of pressure-time relations on the card. The many small increments of pressure change in a given rotary movement of the recording drum makes possible an extremely accurate record, as no inertia effect in the recording mechanism is involved.

In the case of pressure-time diagrams, top center is determined by taking a compression card and noting where, on card and phase gear graduations, the peak of pressure occurs. On subsequent cards, a touch of the finger on the stylus, when this point is reached, establishes it as a reference point on the paper.

In the case of the pressure-volume diagram, top center is determined by taking a compression card and adjusting the gear to a position where the compression and end expansion curves coincide.

In making these cards the phase gear is rotated in the direction in which it was rotated in determining the top center and preferably so as to pass through the engine cycle in natural order of events.

During each period of opening of the sampler valve, a minute quantity of gas passes through the valve and equalizes the pressure within the sampler valve and recording cylinder 208 to that of the engine cylinder and the pressure of the gas within the sampler is trapped by the balanced poppet valve and remains constant until the next period of opening. The gas that is trapped within the sampler and its communication to the sealing liquid chamber exerts its pressure upon the liquid which transmits an equal pressure to a point along the working surface of the poppet valve to provide a positive liquid seal against gas leakage and also transmits its pressure to the recording stylus piston 214 to actuate the stylus in accordance with the instant pressure of the gas. The liquid transmitting medium serves also to prevent the corrosive action of the gases upon the working surfaces which would otherwise take place if the sealing liquid were not employed.

I claim:

1. In a pressure indicator of the character described, phase changing means comprising, a driving shaft driven by the engine under test, a driven shaft rotatable about an axis eccentric with respect to the axis of said driving shaft for transmitting motion to a sampler valve, gears on said shafts for interconnecting the same, and means for adjusting said driven shaft axis in a circle concentric with the axis of said driving shaft for obtaining, at will, variations in the angular phase relation of said shafts.

2. In a pressure indicator of the character described, phase changing means comprising, a driving shaft driven by the engine under test, a driven shaft rotatable about an axis eccentric with respect to the axis of said driving shaft for transmitting motion to a sampler valve, a pinion gear on one of said shafts, an internal gear on the other of said shafts and in mesh with said pinion gear, and means for adjusting said driven shaft axis in a circle concentric with the axis of said driving shaft for obtaining, at will, variations in the angular phase relation of said shafts.

3. In a pressure indicator of the character described, phase changing means comprising a driving shaft driven by the engine under test, a member mounted for rotation about an axis coincident with the axis of said driving shaft, a driven shaft journaled on said adjustable member and having its axis eccentric with respect to the axis of said driving member, gears on said shafts for interconnecting the same, and means for adjusting said rotatable member to thereby effect a relative angular displacement of said driving and driven shafts to obtain at will a phase varying action.

4. In a pressure indicator of the character described, phase changing means comprising, a housing, a driving shaft journaled in said housing, a phase gear provided in said housing and rotatable about an axis coincident with the axis of said driving shaft, a driven shaft journaled in said phase gear for rotation about an axis eccentric with the axis of said driving shaft, gears on said shafts for interconnecting the same, and a worm gear supported by said housing and in mesh with said phase gear for rotatably adjusting the same.

5. In a pressure indicator of the character described, phase changing means comprising, a housing, a driving shaft journaled in said housing, a phase gear provided in said housing and rotatable about an axis coincident with the axis of said driving shaft, a driven shaft journaled in said phase gear for rotation about an axis eccentric with the axis of said driving shaft, gears on said shafts for directly interconnecting the same, a worm gear supported by said housing and in mesh with said phase gear for rotatably adjusting the same, an index carried by said housing, and an adjustable support for a scale carried by said phase gear and cooperating with said index to indicate the degree of phase change.

6. In a pressure indicator of the character described, phase changing means comprising, a housing, a driving shaft journaled in said housing, a phase gear provided in said housing and rotatable about an axis coincident with the axis of said driving shaft, a driven shaft journaled in said phase gear for rotation about an axis eccentric with the axis of said driving shaft, gears on said shafts for interconnecting the same, a worm gear supported by said housing and in mesh with said phase gear for rotatably adjusting the same, a mechanism carried by said phase gear for transmitting motion to a recording element, and a scale and index carried by said mechanism and phase gear respectively.

7. A phase controller comprising, a driving member, a driven member mounted for rotation about an axis eccentric with respect to the axis of rotation of said driving member, a phase variable driving connection between said members, and means for revolving, at will, said driven member about an axis coincident with the axis of said driving member to obtain any desired variation in the phase relation of said driving connection.

8. A phase controller comprising, a driving member, a driven member mounted for rotation about an axis eccentric with respect to the axis of rotation of said driving member, eccentric gearing drivably interconnecting said members, and means for revolving, at will, said driven member about an axis coincident with the axis of said driving member to obtain any desired variation in the phase relation of said gearing.

9. A phase controller comprising, a driving member, a driven member mounted for rotation about an axis eccentric with respect to the axis of rotation of said driving member, eccentric gearing comprising an annular gear and a spur gear carried by said shafts for interconnecting the same in driving relation, and means for revolving, at will, said driven member about an axis coincident with the axis of said driving member to obtain any desired variation in the phase relation of said gearing.

10. A phase controller comprising, a driving member, a driven member mounted for rotation about an axis eccentric with respect to the axis of rotation of said driving member, a variable driving connection between said members, and eccentric means for adjusting, at will, said driven member about an axis coincident with the axis of said driving member to obtain any desired variation in the phase relation of said driving connection.

11. A phase controller comprising, a driving member, a driven member, one of said members being mounted for rotation about an axis eccentric with respect to the axis of rotation of the other of said members, a phase variable driving connection between said members, and means for revolving, at will, one of said members about an axis coincident with the axis of the other of said members for adjusting the phase relation of said driving connection.

12. In a pressure indicator of the character described, phase changing means comprising, a driving shaft driven by the engine under test, a driven shaft rotatable about an axis eccentric with respect to the axis of said driving shaft for transmitting motion to a sampler valve, a variable driving connection between said members, and means for varying, at will, one of said members about an axis coincident with the axis of the other of said members to obtain any desired variation in the phase relation of said driving connection.

FORD L. PRESCOTT.